(12) United States Patent
Sanketi et al.

(10) Patent No.: US 8,928,680 B1
(45) Date of Patent: Jan. 6, 2015

(54) METHOD AND SYSTEM FOR SHARING A BUFFER BETWEEN A GRAPHICS PROCESSING UNIT AND A MEDIA ENCODER

(75) Inventors: Pannag Raghunath Sanketi, Fremont, CA (US); Jamie Gennis, San Jose, CA (US)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 13/545,870

(22) Filed: Jul. 10, 2012

(51) Int. Cl.
*G06F 12/02* (2006.01)
*G06F 15/167* (2006.01)

(52) U.S. Cl.
USPC .......................................... 345/543; 345/541

(58) Field of Classification Search
CPC .......... G06T 1/60; G09G 5/39; G06F 15/167; G06F 12/02–12/0292; G06F 15/16–15/161
USPC .................. 345/530, 531, 541, 543, 544, 503
See application file for complete search history.

(56) References Cited

U.S. PATENT DOCUMENTS

| | | | |
|---|---|---|---|
| 5,913,038 A | 6/1999 | Griffiths | |
| 5,943,065 A | 8/1999 | Yassaie et al. | |
| 7,379,068 B2 | 5/2008 | Radke | |
| 7,719,579 B2 | 5/2010 | Fishman et al. | |
| 8,098,957 B2 | 1/2012 | Hwang et al. | |
| 8,102,399 B2 | 1/2012 | Berman et al. | |
| 8,542,265 B1 | 9/2013 | Dodd et al. | |
| 2002/0099840 A1 | 7/2002 | Miller et al. | |
| 2003/0193486 A1 | 10/2003 | Estrop | |
| 2003/0210338 A1 | 11/2003 | Matsuoka et al. | |
| 2004/0017490 A1 | 1/2004 | Lin | |
| 2005/0024384 A1 | 2/2005 | Evans et al. | |
| 2005/0063586 A1 | 3/2005 | Munsil et al. | |
| 2005/0104979 A1 | 5/2005 | Fukuoka et al. | |
| 2006/0164437 A1 | 7/2006 | Kuno | |
| 2006/0268124 A1 | 11/2006 | Fishman et al. | |
| 2007/0269115 A1 | 11/2007 | Wang et al. | |
| 2008/0055428 A1 | 3/2008 | Safai | |
| 2008/0124041 A1 | 5/2008 | Nielsen et al. | |
| 2008/0211931 A1 | 9/2008 | Fujisawa et al. | |
| 2008/0291209 A1 | 11/2008 | Sureka et al. | |
| 2009/0073168 A1 | 3/2009 | Jiao et al. | |
| 2009/0164655 A1 | 6/2009 | Pettersson et al. | |
| 2010/0111489 A1 | 5/2010 | Presler | |
| 2010/0150441 A1 | 6/2010 | Evans et al. | |

(Continued)

OTHER PUBLICATIONS

The Khronos Group Inc., "OpenMAX Integration Layer Application Programming Interface Specification," Dec. 16, 2005, 326 pages, Version 1.0.

(Continued)

*Primary Examiner* — Jacinta M Crawford

(74) *Attorney, Agent, or Firm* — Young Basile Hanlon & MacFarlane P.C.

(57) ABSTRACT

A program module executing in a first process space of a mobile computing device receives a buffer request from a graphics driver running in a second process space of the mobile computing device, wherein the second process space is isolated from the first process space. The program module assigns a buffer to the graphics driver to store image data processed by a graphical processing unit (GPU) controlled by the graphics driver. The program module receives a release of the buffer from the graphics driver. The program module assigns the buffer to a media encoder driver for a hardware media encoder to encode the image data in the buffer into a file.

21 Claims, 10 Drawing Sheets

(56) References Cited

U.S. PATENT DOCUMENTS

| | | |
|---|---|---|
| 2011/0078532 A1 | 3/2011 | Vonog et al. |
| 2011/0122036 A1 | 5/2011 | Leung et al. |
| 2011/0122946 A1* | 5/2011 | Owen et al. ............. 375/240.12 |
| 2012/0002080 A1 | 1/2012 | Sasaki |
| 2012/0252679 A1 | 10/2012 | Holcomb |
| 2012/0262603 A1 | 10/2012 | Chen et al. |
| 2012/0314102 A1 | 12/2012 | Wang |
| 2013/0182130 A1 | 7/2013 | Tran |

OTHER PUBLICATIONS

US Patent Application entitled "Method and System for Processing and Storing Image Data in a Mobile Device", U.S. Appl. No. 13/545,874, filed Jul. 10, 2012, by inventor Sanketi et al.

* cited by examiner

METHOD AND SYSTEM FOR SHARING A BUFFER BETWEEN A GRAPHICS PROCESSING UNIT AND A MEDIA ENCODER

TECHNICAL FIELD

Embodiments of the present invention relate to the field of image processing and, more particularly, to a pipeline for processing and storing image data on a mobile device.

BACKGROUND

Many modern mobile devices (e.g., such as mobile phones) have integrated cameras and processors. However, image data consumes considerable resources. Moreover, image processing also consumes considerable resources. Accordingly, mobile devices that are resource limited may have restrictions with regards to capturing images, performing image processing and/or storing processed images.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an embodiment of the present invention, a program module executing in a first process space of a mobile computing device receives a buffer request from a graphics driver running in a second process space of the mobile computing device, wherein the second process space is isolated from the first process space. The program module assigns a buffer to the graphics driver to store image data processed by a graphical processing unit (GPU) controlled by the graphics driver. The program module receives a release of the buffer from the graphics driver. The program module assigns the buffer to a media encoder driver for a hardware media encoder to encode the image data in the buffer into a file.

In addition, methods and systems for performing the operations of the above described implementations are also implemented. Further, a computer readable storage media is provided to store instructions for performing the operations of the above described implementations.

BRIEF DESCRIPTION OF THE DRAWINGS

The present invention will be understood more fully from the detailed description given below and from the accompanying drawings of various embodiments of the invention.

DETAILED DESCRIPTION

A system and method for capturing, processing and encoding image data are disclosed. A mobile computing device includes an image capture device, a graphical processing device (GPU) and a hardware media encoder. In one embodiment, the GPU receives and processes image data captured by the image capture device. This processing may include analyzing the image data and/or modifying the image data. After the image data is processed by the GPU, the hardware media encoder encodes the processed image data into a file. Accordingly, a user may record a video, the GPU may modify frames of the video, and the hardware media encoder may encode those modified frames into a video file.

A system and method for sharing an image buffer between a GPU and a hardware media encoder are also disclosed. In one embodiment, a program module executing in a process space shared with the media encoder manages a buffer pool. The program module may assign buffers to a graphics driver running in a different process space of the mobile computing device and to an encoder driver for the hardware media encoder. After the GPU has processed image data and written it to a buffer, the program module may assign that buffer (containing the processed image data) to the media encoder without generating any copies of the image data. The media encoder may then encode the processed image data.

Embodiments of the present invention are described with reference to image data. The image data may include still images as well as videos. The image data may be digital image data, which may include a single image (in the case of a still image) or multiple image frames that may be chronologically connected (in the case of a video). Digital images and videos generally comprise multiple picture elements (e.g., pixels) arranged in a two-dimensional array. Each pixel may have a color and/or a color value associated with the pixel. Information associated with the location and color of each pixel may be stored and/or used by a computer system to display the digital image and/or video.

Note that though embodiments of the present invention are discussed with reference to image data, embodiments of the present invention also apply to audio data. Accordingly, it should be understood that teachings presented herein on image data and image processing are equally applicable to audio data and audio processing. Additionally, image data may be associated with audio data (e.g., in the case of a video with visual and audio components), and may be processed in parallel to or together with the audio data.

Figure 1:
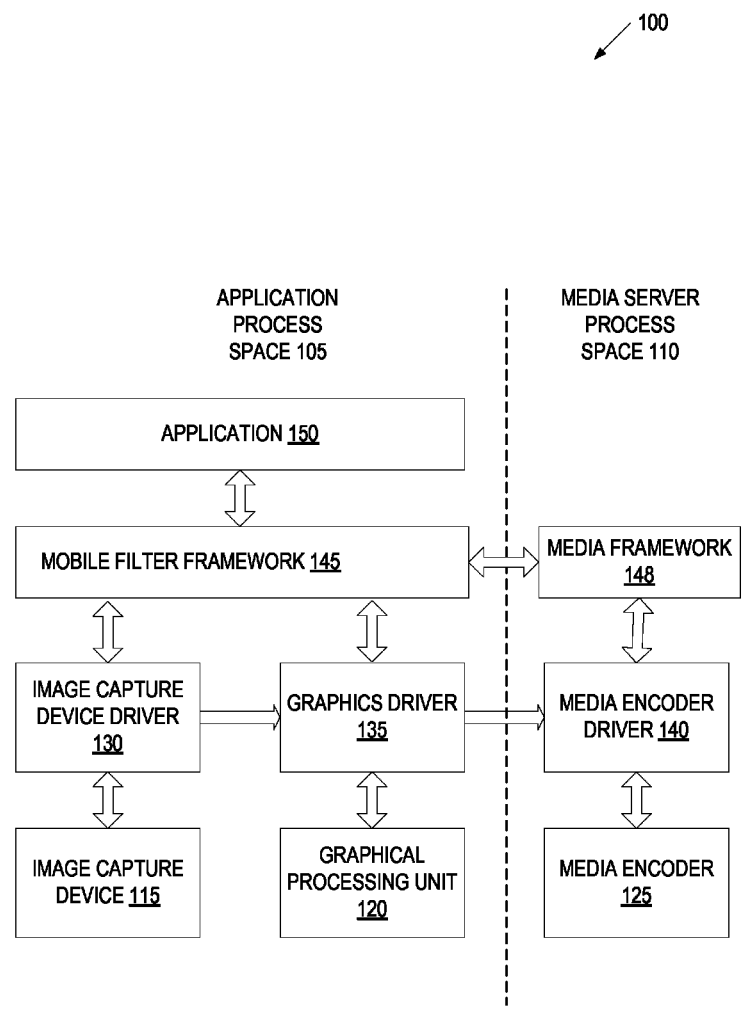
FIG. 1 illustrates an image processing pipeline architecture, in accordance with one embodiment of the present invention.

FIG. 1 illustrates an image processing pipeline architecture 100, in accordance with one embodiment of the present invention. The image processing pipeline architecture 100 comprises hardware components of an image capture device 115 (e.g., a charge coupled device (CCD) image sensor or a complimentary metal oxide semiconductor (CMOS) image sensor), a graphical processing unit (GPU) 120 and a media encoder 125. These hardware components 115, 120, 125 may all be components of a mobile computing device, such as a mobile phone, a tablet computer, a netbook, a portable gaming device, a digital camera, a laptop computer, etc. The mobile computing device may run an operating system (OS) that manages hardware (e.g., hardware elements 115, 120, 125) and software (e.g., image capture device driver 130, graphics driver 135, media encoder driver 140, mobile filter framework 145, application 150, etc.) of the mobile computing device. The mobile computing device may be a resource limited device. Accordingly, in embodiments the mobile computing device may have insufficient resources to perform image processing and/or image or video encoding with software components, and may instead perform such operations using hardware components.

Each of the hardware components 115, 120, 125 may be controlled by a driver. In particular, the image capture device 115 may be controlled by an image capture device driver 130, GPU 120 may be controlled by a graphics driver 135 and media encoder 125 may be controlled by an media encoder driver 140. Each driver may be configured to control specific hardware or set of hardware (e.g., manufactured by a particular vendor). Additionally, graphics driver 135 may be configured to support a graphics API such as open graphics library embedded system (OpenGL ES®). Similarly, the media encoder driver 140 may be configured to support an encoder/decoder API such as OpenMax® integration layer (OpenMax IL®).

Image data may originate from the image capture device 115, be processed by the GPU 120, and then ultimately be encoded by the media encoder 125. This may be performed with minimal or no copying of the image data. For example, a single copy of the image data may be shared by the GPU 120 and the media encoder 125. Alternatively, or additionally, image data may originate from a media decoder (which may correspond to media encoder 125) that has decoded a stored image. The image data may then be processed by the GPU 120 and then be encoded by the media encoder 125.

As mentioned, the image processing pipeline may also operate as an audio processing pipeline and/or as a multimedia processing pipeline (e.g., that processes audio and video). For example, the image capture device 115 may be replaced or supplemented with an audio capture device (e.g., a microphone), and the image capture device driver 130 may be replaced or supplemented with an audio capture device driver. Additionally, the GPU 120 may be replaced or supplemented with an audio digital signal processor (DSP) and the graphic driver may be replaced with an audio driver. Note that some GPUs and/or graphics drivers are able to perform digital audio processing. Accordingly, the GPU 120 and/or graphics driver 135 may operate on both image data and audio data. Additionally, the media encoder driver 140 and media encoder 125 may operate on image data (both still images and video) as well as audio data.

The device drivers 130, 135 interface with a mobile filter framework 145 that runs in the application process space 105 and/or with a media framework 148 that runs in the media server process space 110. The mobile filter framework 145 abstracts operations performed by the drivers 130, 135, and provides a plug-and-play framework that is accessible by applications (e.g., application 150). Similarly, the media framework 148 may abstract operations performed by media encoder driver 140 and/or other drivers controlled from the media server process space 110. The application 150 may request a particular operation, and the mobile filter framework 145 and/or media framework 148 may interface with the device drivers 130, 135 to instruct them to perform individual operations that will achieve the operation requested by the application 150. For example, the application 150 may request that an image be taken with a specific image effect enabled. The mobile filter framework 145 may instruct the image capture device driver 130 to cause the image capture device 115 to record an image. The mobile filter framework 145 may then instruct the graphics driver 135 to cause the GPU 120 to apply the selected effect to the image. The media framework 148 may then instruct the media encoder driver 140 to cause the media encoder 125 to encode the processed image into a file.

The image capturing, image processing and/or image encoding performed by the image processing pipeline architecture 100 may be performed in real time or near real time. As used herein, near real time performance means that image data (e.g., image frames) are processed by the GPU 120 as they are output by the image capture device 115, and that processed images are encoded by the media encoder 125 as they are output by the GPU 120. Accordingly, for near real time performance, a processing time and encoding time per frame may be approximately equal to a sampling period of the image capture device 115. Therefore, a user may point a camera at a person's head, record a stream of camera images, identify the person's face in those camera images, process the camera images to add effects (e.g., enlarging the person's nose and/or eyes), and encode the processed camera images (with the added effects) into a file. The image processing pipeline architecture 100 may enable these operations to be performed in a resource efficient manner, with minimal or no copying of image data.

In one embodiment, the application 150, image capture device driver 130 and graphics driver 135 run in an application process space 105, and the media encoder driver 140 runs in a media server process space 110 that is isolated from the application process space 105. The mobile filter framework 145 may run in the application process space 105, and the media framework 148 may run in the media server process space 110. Communication between the application process space 105 and the media server process space 110 may be facilitated by software components residing in one or both of the application process space 105 and the media server process space 110, as described below.

Figure 2:
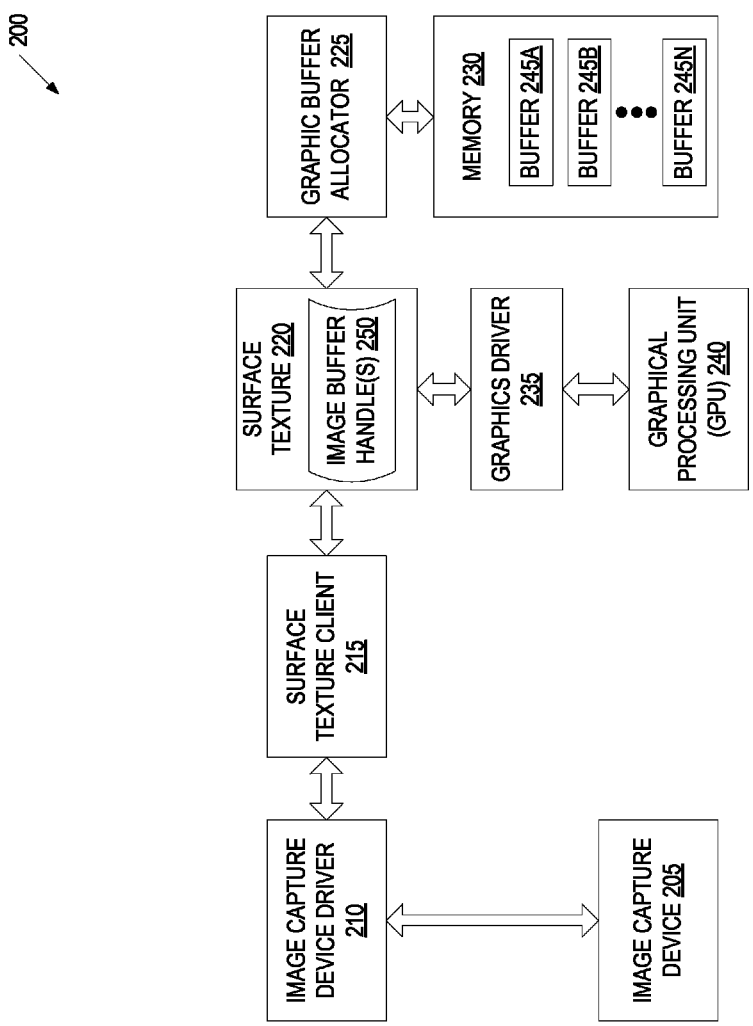
FIG. 2 illustrates an architecture for communicating image data between an image capture device and a graphical processing unit, in accordance with one embodiment of the present invention.
Figure 3:
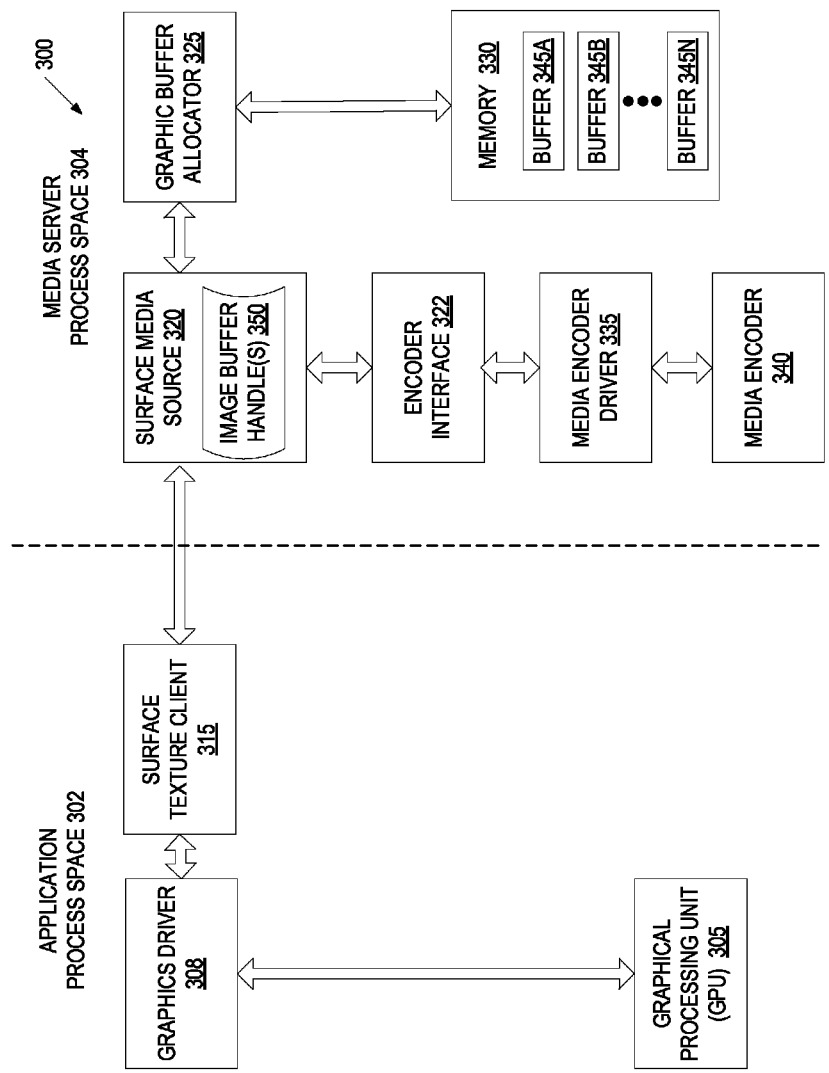
FIG. 3 illustrates an architecture for communicating image data between a graphical processing unit and a hardware media encoder, in accordance with one embodiment of the present invention.

The image processing pipeline architecture 100 may be divided into an image producer pipeline 200, shown in FIG. 2, and an image consumer pipeline 300, shown in FIG. 3. The image producer pipeline 200 connects the image capture device 115 to the GPU 120. The image consumer pipeline 300 connects the GPU 120 to the media encoder 125. Together, the image producer pipeline 200 and the image consumer pipeline 300 enable data originating from the image capture device 115 to be processed by the GPU 120 and then encoded by the media encoder 125.

Referring now to FIG. 2, in one embodiment the image producer pipeline 200 includes an image capture device 205 as an image source and a GPU 240 as an image consumer. The image capture device 205 is controlled by an image capture device driver 210, and the GPU 240 is controlled by a graphics driver 235, which communicate via one or more intermediary modules (e.g., surface texture client 215 and surface texture 220). The graphics driver 235 may be designed specifically to control the GPU 240, but may be configured to support the OpenGL ES application programming interface (API). Therefore, higher level software (e.g., an application and/or framework) that interfaces with the graphics driver 235 may communicate with the graphics driver using the OpenGL ES API.

In response to a user generating an image capture command (or in anticipation of the user generating such a command), the image capture device driver 210 may request an image buffer for the image capture device 205 to write image data to. The image capture device driver 210 may send an image buffer request to surface texture client 215. The image buffer request may include a series of buffer properties for image buffers that the image capture device 205 writes to are expected to have. The buffer properties may include a specified height, width, pixel format, and so on. The buffer request that surface texture 220 sends to the graphic buffer allocator 225 may be in the form of a dequeue buffer command. The dequeue buffer command is a request to assign an image buffer from a pool or queue of available image buffers. This image buffer pool may be managed by the surface texture 220. The dequeue buffer command may contain the buffer properties that were specified by the image capture device driver 210.

Surface texture client 215 may communicate the image buffer request to surface texture 220. In one embodiment, surface texture client 215 and surface texture 220 run in different processes. Accordingly, the communication between surface texture client 215 and surface texture 220 may be over an inter-process boundary. Such communications across inter-process boundaries are described in greater detail below. If surface texture 220 has been assigned any image buffers having the specified buffer properties and/or there are free image buffers available having the specified buffer properties, then surface texture 220 assigns such an image buffer to the surface texture client 215. Otherwise, surface texture 220 may send an image buffer request to graphic buffer allocator 225.

Graphic buffer allocator 225 manages a memory 230. In response to receiving a buffer request, graphic buffer allocator 225 sets up one or more image buffers (e.g., buffers 245A, 245B through 245N) that comply with specified buffer properties. These image buffers may be formatted for a specific device (or devices), such as the image capture device 205 and/or GPU 240. Graphic buffer allocator 225 then assigns the one or more image buffers to surface texture 220.

Surface texture 220 may manage a pool or queue of image buffers, which are assigned to surface texture 220 by graphic buffer allocator 225. Once surface texture 220 has an available image buffer, surface texture 220 may assign the buffer to surface texture client 215. Surface texture client 215 may in turn assign the image buffer to image capture device driver 210. Image capture device driver 210 may then instruct the image capture device 205 to capture image data and write the image data to the assigned image buffer.

After image capture device 205 has written to an image buffer, image capture device driver 210 may issue a queue buffer call on that image buffer. Surface texture client 215 may receive the queue buffer command and forward it to surface texture 220. Surface texture 220 may then reassign the image buffer to graphics driver 235, and GPU 240 may process the contents of the image buffer.

In one embodiment, image capture device driver 210 communicates with surface texture client 215 via a native window interface. The native window interface may be a native API for managing windows, and may provide an ability to draw directly to image buffers. Surface texture client 215 may generate a native window object for the image capture device driver 210. The image capture device driver 210 may request an image buffer by issuing a dequeue buffer call to the native window object. The image capture device 205 may then draw directly to the image buffers that are associated with the native window object. Subsequently, image capture device driver 210 may return the image buffer by issuing a queue buffer call for the image buffer to the native window object.

Surface texture client 215 may communicate with the surface texture 220 via a surface interface (which may be a native platform graphics interface such as EGL®). The surface interface is an interface between higher rendering APIs (e.g., the OpenGL ES API) supported by the graphics driver 235 and the underlying native platform window system (e.g., the native window interface). Surface texture client 215 may create a surface object, which may use the native window interface. The surface object may create graphics contexts for APIs, and may synchronize drawing by native platform rendering APIs and higher rendering APIs. The image capture device driver 215 and/or image capture device 205 may then interact with the surface object directly in native code using the native window object. The GPU 240 and/or graphics driver 235 may interact with the surface object as well. Accordingly, when the image capture device 205 writes image data to the surface object in the native window object, the GPU 240 will be able to process that image data. Thus, surface texture 220 may take images from some arbitrary image producer (e.g., image capture device 205) and expose those images to image consumers (e.g., to GPU 240).

Surface texture 220 may send a request to graphic buffer allocator 225 for one or more image buffers to be associated with the surface object. The graphic buffer allocator 225 may allocate and map graphics memory (e.g., image buffers) to application processes. In one embodiment, surface texture 220 communicates with the graphic buffer allocator 225 using a graphics allocation interface (e.g., a graphics allocation (gralloc) API). The graphics allocation interface may accept dequeue buffer commands, queue buffer commands, create buffer commands, and so forth. If no buffer is allocated when a dequeue buffer call is made, this may trigger a request buffer call if a buffer is not already prepared.

In response to receiving a dequeue buffer command from surface texture 220 for a surface object, graphic buffer allocator 225 may determine whether an unassigned image buffer 245A-245N has buffer properties included in the request. If no such image buffer is already available, then graphic buffer allocator 225 may generate a buffer having the requested properties from available memory. Once an image buffer having the requested buffer properties is available, graphic buffer allocator 225 assigns that image buffer to the surface object associated with the request.

In one embodiment, an image buffer is assigned by passing an image buffer handle 250 to surface texture 220 for the surface object. The image buffer handle 250 may include a pointer to a section of graphics memory (to an image buffer), as well as additional information that can be interpreted by native or device specific code (e.g., by the graphics driver 235 and/or image capture device driver 210). The additional information in a buffer handle 250 may include pixel format, width, height, and so on.

The form that the image buffer handle 250 takes (e.g., the pixel format) may be a device specific implementation detail. Moreover, the form that the image buffer handle 250 takes may also be device specific. Accordingly, device specific code may interpret the image buffer handle 250 (e.g., determine a memory location to which it points), but higher level software such as an application or operating system may not be able to interpret the image buffer handle 250. Therefore, the image buffer handle 250 may act as a layer of abstraction. By keeping a format of these image buffer handles 250 opaque to the operating system level, different hardware components are able to use whatever formats they select. Thus, hardware components may use whatever format is most efficient, without any constraints imposed by higher level software. Note that graphic buffer allocator 225 may assign multiple image buffer handles 250 to a single surface object.

Surface texture client 215 then provides image capture device driver 210 with information about the native window object, surface object and any image buffer handles that have been assigned to the surface object. The image buffers associated with the image buffer handles can then be utilized by the image capture device 205.

The image capture device 205 will write to a memory region (the image buffer) specified in the image buffer handle 250, and will then call into the native window object to indicate that it is done filling the image buffer. In one embodiment, this is done by issuing a queue command for the image buffer to the native window object, which relinquishes control of the image buffer from the image capture device driver 210 to the native window object. In response, the surface texture client 215 may forward the queue command to surface texture 220 via the surface object. The surface texture 220 may then notify a consumer (e.g., the graphics driver 235 or an application), that the image buffer has been filled. Subsequently, surface texture 220 may assign the surface buffer handle 250 to the graphics driver 235. When the GPU 240 is ready to use the image buffer, the GPU 240 may use the image buffer handle 250 to access the image data stored in the image buffer. In one embodiment, no copies are made to provide the captured image data to the GPU 240 for processing.

The principles of operation shown with reference to the image producer pipeline 200 apply equally to any media source. Accordingly, it should be noted that the image producer pipeline 200 may be modified by replacing the image capture device driver 210 and image capture device 205 with other media sources. For example, image capture device 205 may be replaced with a hardware image decoder, and image capture device driver 210 may be replaced with a decoder driver. Alternatively, image capture device 205 may be replaced with an audio capture device, and image capture device driver may be replaced by an audio capture device driver. Moreover, the image producer pipeline 200 may operate in parallel to other media producer pipelines.

Referring now to FIG. 3, the image consumer pipeline 300 includes a GPU 305 as an image source and a hardware video encoder 340 as an image consumer. The GPU 305 is controlled by a graphics driver 308 and the video encoder 340 is controlled by a video encoder driver 335, which communicate via one or more intermediary modules (e.g., surface texture client 315 and surface media source 320). The graphics driver 308 may support, for example, the OpenGL ES API. The video encoder driver 335 may support, for example, the Openmax IL API.

The graphics driver 308 that controls the GPU 305 and a surface texture client 315 that communicates with the graphics driver 308 run in an application process space 302. The video encoder driver 335 that controls the video encoder 340 may run in a media server process space 304 that is isolated from the application process space 302. A surface media source 320 that is configured to direct image buffers from the GPU to the hardware video encoder 340 and graphic buffer allocator 325 may also run in the media server process space 304. The isolation between the application process space 302 and the media server process space 304 provides a layer of security for graphics data that may be displayed on a screen of a mobile device. Such isolation may, for example, prevent applications from screen scraping to obtain data controlled by other applications.

GPU 305 may receive an image buffer that was populated with data by an image capture device (e.g., image capture device 205 of FIG. 2) as set forth above. GPU 305 may then process the contents of that image buffer. Before, during, or after the GPU 305 processes the image data, graphics driver 308 may request a buffer from surface texture client 315 for the GPU 305. Surface texture client 315 may in turn request the image buffer from surface media source 320. Surface media source 320 may then request the image buffer from graphic buffer allocator 325, which may manage memory 330 (e.g., containing image buffers 345A, 345B, through 345N). Graphic buffer allocator 325 may assign an image buffer to surface media source 320, which may assign the image buffer to surface texture client 315, which may assign the image buffer to graphics driver 308.

Once a new image buffer is available for the GPU 305, the GPU 305 may write processed image data to that image buffer. The processed image data may include data on a color space used, pixel data for multiple pixels, and so forth. The graphics driver 308 may pass a handle for the populated image buffer to surface texture client 315. Surface texture client 315 may then pass the handle for the populated image buffer to surface media source 320, which in turn may pass the handle for the populated image buffer to video encoder driver 335 via an encoder interface 322. Video encoder 340 may then encode the contents of the image buffer.

In one embodiment, the image producer pipeline 200 and the image consumer pipeline 300 use different buffer pools. Therefore, modifications may be made to the image data in an image producer buffer, and those modifications may be written to an image consumer buffer. This may cause original unmodified image data to remain in an original format while the image data is processed by the GPU. Alternatively, the image producer pipeline 200 may share a buffer pool with the image consumer pipeline. In such an embodiment, data transfers from the image producer pipeline to the image consumer pipeline may be performed without generating data copies. However, original image data may be overwritten with modifications caused by the image processing.

In one embodiment, graphics driver 308 communicates with surface texture client 315 via a native window interface. Surface texture client 315 may generate a native window object for the graphics driver 308. The graphics driver 308 may then request buffers from the native window object, have the GPU 305 draw directly into those buffers, and return the buffers to the native window object.

Surface texture client 315 may communicate with surface media source 320 via a surface interface (e.g., an EGL surface). Surface media source 320 may assign a surface to the native window created by the surface texture client 315. The graphics driver 308 and/or GPU 305 may then interact with the surface object directly in native code using the native window object. The media encoder 340 may interact with the surface object as well. Accordingly, when the GPU 305 writes image data to the surface in the native window, the media encoder 340 will be able to encode that image data. Thus, surface media source 320 may take images from the GPU 305 and expose those images to media encoder 340, running in a different process space than the GPU 305.

Surface media source 320 may additionally send a request to graphic buffer allocator 325 for one or more image buffers to be associated with the surface object. In one embodiment, surface media source 320 communicates with the graphic buffer allocator 325 using a graphics allocation interface (e.g., a graphics allocation (gralloc) API).

In response to receiving a dequeue buffer command from surface media source 320 for a surface object, graphic buffer allocator 325 may determine whether an available image buffer 345A-345N has buffer properties included in the request. If no such image buffer is already available, then graphic buffer allocator 325 may generate an image buffer having the requested properties, and return the image buffer to surface media source 320. In one embodiment, graphic buffer allocator 325 assigns the image buffer to the surface object associated with the request.

In one embodiment, an image buffer is assigned by passing an image buffer handle 350 to surface media source 320 for the surface object. The image buffer handle 350 may include a pointer to a section of graphics memory (to an image buffer), as well as metadata such as pixel format, width, height, and so on. Note that graphic buffer allocator 325 may assign multiple image buffer handles 350 for multiple image buffers to a single surface object. Surface media source 320 may then provide the image buffer handles 350 to surface texture client 315 across a process boundary between the media server process space 304 and the application process space 302.

In one embodiment, the cross process communication of the image buffer handles is controlled based on file descriptors. Image buffer handles may each include one or more file descriptors, and may be passed between process spaces based on the file descriptors. An operating system kernel may keep track of which processes have access to each file descriptor. A process may be unable to gain access to an image buffer handle (and thus the underlying image buffer that it points to) until the kernel associates that process with a file descriptor for that image buffer handle. The kernel may associate a new process to one or more file descriptors in response to receiving a request from a process that already has access to the file descriptors (e.g., surface media source 320) to grant access to the new process. In one embodiment, the file descriptors are passed into the kernel, and the kernel duplicates the file descriptors from one process to another process to give that other process access to them. The other information from the image buffer handles may then be copied and passed along with the duplicated file descriptors to the new process.

In order for surface media source 320 to assign an image buffer handle 350 to surface texture client 315, surface media source 320 may perform a callback into the kernel and instruct the kernel to grant the application process 302 access to the file descriptor associated with the image buffer handle 350. Once this has been performed, surface texture client 315 provides image capture device driver 210 with information about the native window object, surface object and image buffer handles 350 that have been assigned to the surface object. The image buffers associated with the image buffer handles 350 can then be utilized by the image capture device 205.

The GPU 305 will write to a memory region (the image buffer) specified in the image buffer handle 350, and will then call into the native window object to indicate that it is done filling the image buffer. In one embodiment, this is done by issuing a queue command for the image buffer to the native window object to relinquish control of the image buffer. In response, the surface texture client 315 may forward the queue command to surface media source 320 via the surface interface over an inter-process communication. The surface media source 320 may then provide the image buffer handle 350 to the encoder interface 322, which may pass the image buffer handle 350 to video encoder driver 335 for use by hardware video encoder 340.

In one embodiment, encoder interface 322 periodically queries surface media source 320 for image buffer handles 350 associated with image buffers that have been populated with processed image data by GPU 305. Alternatively, surface media source 320 may notify encoder interface 322 when such image buffer handles 350 become available. When an image buffer handle 350 pointing to an image buffer populated with processed image data is available, encoder interface 322 takes control of that image buffer handle 350, and passes it to the media or video encoder driver 335. In one embodiment, encoder interface 322 issues a dequeue command on the image buffer handle 350 to obtain access to the image buffer.

Video encoder driver 335 may have its own memory buffer pool, with buffers having a different format and corresponding to a different protocol than the discussed image buffers. Encoder interface 322 may query video encoder driver 335 for a buffer to populate with data. Encoder driver 335 may then assign a buffer to encoder interface 322. This buffer may be associated with application level memory space. Traditional encoder APIs accept actual pixel data as input. However, in one embodiment rather than filling the buffer with pixel data, encoder interface 322 and/or surface media source 320 populate the buffer with an image buffer handle 350. Video encoder driver 335 may then access the image data associated with the image buffer handle 350.

In one embodiment, encoder interface 322 passes a buffer (e.g., a pointer to the buffer) from the media encoder driver's memory pool to surface media source 320 with a request for the buffer to be filled in. Surface media source 320 may then block if it doesn't have image data (e.g., a frame) to write into the buffer. If image data is available (e.g., when an image buffer handle is returned to surface media source 320 by graphics driver 308), surface media source 320 takes that image buffer handle and copies it into the buffer that it got from encoder interface 322. Surface media source 320 may indicate to the encoder interface 322 (and eventually to the encoder driver 335) that the buffer type that was copied is a handle to the buffer as opposed to the actual buffer data itself. Encoder interface 322 then indicates to media encoder driver 335 that it is done filling in that buffer, and may request a next buffer.

After an image buffer of the media encoder driver 335 is populated with an image buffer handle 350, the media encoder 340 takes the graphics data that was processed by the GPU 305 and puts it in some encoded format that can be played or read. This may include compressing the image data (e.g., performing image compression, video compression and/or audio compression) to reduce a size of the image data. This may further include wrapping the image data in a container (e.g., a file) and storing the container. In one embodiment, media encoder driver 335 includes one or more codecs for encoding and decoding still images, videos and/or audio. Examples of audio codecs include advanced audio coding (AAC), motion picture experts group 4 (MPEG-4), Dolby® Digital Codec (AC-3), MPEG Audio Layer 3 (MP3), Windows® Media Audio (WMA), Apple Lossless Audio Codec (ALAC), and so on. Examples of video codecs include MPEG-1, MPEG-2, MPEG-4, VC-1, DivX®, and so on. Examples of still image codecs include bitmap (BMP), graphics interchange format (GIF), joint photograph experts group (JPEG), tagged image file format (TIFF), portable network graphics (PNG), and so on.

Notably, the processed image data in the image buffer may be encoded by the video encoder 340 without any copies of the processed image data having been generated. In other words, the video encoder 340 may access the same memory space (image buffer) used by the GPU 305 in order to encode the processed image data. Such shared use of the image buffers may be implemented in spite of the graphics driver 308 and the video encoder driver 335 running in two different isolated process spaces. As discussed above, the surface texture client 315 and/or surface media source 320 may act as intermediaries to facilitate buffer sharing between the GPU 305 and media encoder 340 across process boundaries. Moreover, such sharing of image buffers may be performed without using tunneling. This enables implementation details of the image buffer sharing to be abstracted, so that a single buffer sharing solution can be achieved across different hardware implementations.

In one embodiment, surface texture client 315 and surface media source 320 enable a flexible color space conversion. Different hardware vendors have different capabilities and different hardware components. Color spaces that the GPU 305 uses and that the video encoder 340 uses are generally different. For example, GPU 305 may use a red-green-blue (RGB) color space, and video encoder 340 may use a luma-chrominance (YUV) color space.

In one embodiment, surface texture client 315 directs the graphics driver 308 to cause the GPU to convert image data from the color space supported by the GPU 305 (e.g., RGB) into the color space supported by the hardware video encoder 340 (e.g., YUV). Surface media source may determine the color space supported by the hardware video encoder 340 (e.g., by querying the encoder driver). Surface texture client may then notify graphics driver 308 of the determined color space to enable such a conversion. In an alternative embodiment, surface media source 320 directs video encoder driver 335 to cause hardware video encoder 340 to convert the image data from the color space supported by the GPU 305 into the color space supported by the video encoder 340. Surface texture client 315 may determine the color space supported by the GPU 305 (e.g., by querying the graphics driver). Surface media source 320 may then notify the media encoder driver 335 of the determined color space to enable such a conversion. Notably, the color conversion may be performed by either the GPU 305 or by the media encoder 340. The color conversion process and color space information may be hidden from higher level software, such as the OS and/or applications. For example, at the device agnostic OS level, information on whether the values in the image buffer are RGB values or YUV values may be unavailable. Thus, the surface media source 320 may orchestrate the ownership of the image buffers without having knowledge on the contents of those image buffers.

Figure 4:
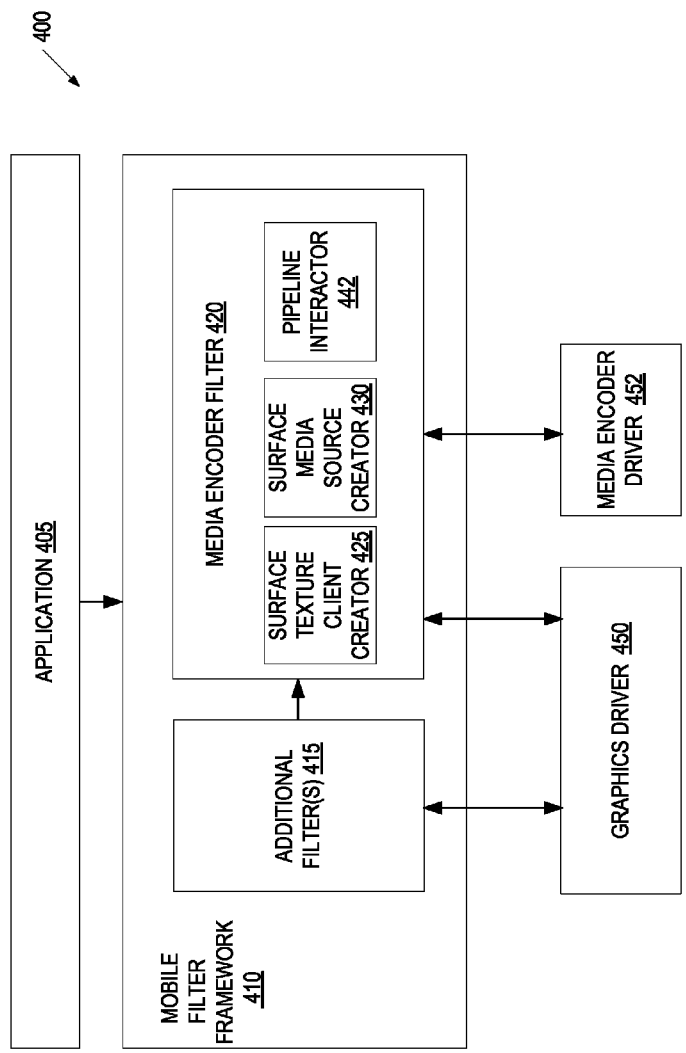
FIG. 4 illustrates a media encoder filter in a mobile filter framework, in accordance with one embodiment of the present invention.

FIG. 4 illustrates an architecture 400 including a media encoder filter 420 in a mobile filter framework 410, in accordance with one embodiment of the present invention. An application 405 interacts with the mobile filter framework 410, which in turn interacts with underlying device drivers (e.g., with a graphics driver, an image capture device driver, an encoder driver, etc.).

The mobile filter framework 410 is a multimedia processing and analysis framework. The mobile filter framework 410 utilizes GPU capabilities on a mobile platform to perform computationally intensive tasks in real time (or near real time) such as video analysis and effects. The filter framework 410 provides an API for the application 405 to interface with underlying hardware components such as the GPU, image capture device and/or media encoder. Therefore, the application 405 may issue commands for the underlying components without having any information about any underlying protocols or configurations. The framework 410 includes a series of filters that can be arranged into a graph configuration to create various effects such as funny faces, virtual backgrounds, image processing effects, etc. In one embodiment, the output of these filters is an image created using the OpenGL embedded system (ES) API. However, other output formats may also be used.

Each filter in the mobile filter framework 410 may be a plug and play component that is suitable for use in a filter graph environment. In one embodiment, the application 405 instructs the mobile filter framework 410 to perform an operation on an image, and the mobile filter framework 410 determines which filters to use to perform the operation. The application 405 may specify a particular filter graph (e.g., a particular arrangement of filters), or may rely upon the mobile filter framework 410 to automatically configure a filter graph based on a requested operation or operations. In either case, the media filter framework 410 may launch and/or connect the filters, and may take care of scheduling and type checking on filter ports.

Each filter may generate appropriate commands, which are directed to one or more underlying device drivers. For example, a filter 415 may issue OpenGL commands to communicate with a graphics driver 450, and media encoder filter 420 may issue OpenMax IL commands to communicate with media encoder driver 452. Additionally, media encoder filter 420 may also issue OpenGL commands to communicate with graphics driver 450. By way of illustration, some example commands that may be issued to graphics driver 450 include commands to perform object detection and/or image recognition on an image (e.g., to perform face detection), commands to change colors, commands to modify an image (e.g., modify an appearance of a face such as enlarge a head, nose, eyes, etc.), and so forth. Filters may also be configured to identify foreground and/or background elements in images, to blend images (e.g., to replace background elements of an image with a virtual background from another image), and so forth. Each filter may provide an API to talk to the underlying components (e.g., OpenGL, Openmax IL, etc.). Each filter on its own can choose whether particular image processing takes place on the GPU or on the CPU.

Each filter may include an input and/or an output. Filters that have an output but no input may represent image sources (e.g., a filter that represents an image capture device or image decoder). Filters that have an input but no output may represent image sinks (e.g., a filter that represents a display or an encoder). Filters that have both an input and an output may represent intermediate processes that can be performed on image data. Mobile filter framework 410 may select filters and arrange them into a filter graph, and may connect the filters in accordance with the filter graph. Alternatively, the filters and arrangement of filters may be specified by the application 405 in a filter graph. Source nodes are arranged at a top of the graph, and sink nodes are arranged at a bottom of the graph, and may be connected by one or more intermediate nodes. To connect filters together, each filter specifies which inputs it can receive and what outputs it produces. The filter graph may be arranged by matching up inputs to outputs of the same type. One example of a filter graph is discussed below with reference to FIG. 5.

The mobile filter framework 410 is shown to include a media encoder filter 420 and one or more additional filters 415 that provide image data to the media encoder filter 420. Media encoder filter 420 provides a wrapper around the image consumer pipeline 300 described with reference to FIG. 3. The media encoder filter 420 is a plug and play component of the mobile filter framework 410 for encoding the output of any other filter (e.g., additional filters 415).

In one embodiment, media encoder filter 420 establishes the media consumer pipeline 300 of FIG. 3. This may include loading the surface texture client 315 in the application process space 302, and loading the surface media source 320 and/or encoder interface 322 in the media server process space 304. This may further include setting up connections between the graphics driver 308, the surface texture client 315, the surface media source 320, the encoder interface 322 and/or the video encoder driver 335.

Referring back to FIG. 4, in one embodiment media encoder filter 420 includes a surface texture client creator 425, a surface media source creator 430 and a pipeline interactor 442. When media encoder filter 420 is loaded, surface texture client creator 425 creates a surface texture client in a process space shared with the media encoder filter and the application. Surface media source creator 430 also causes a surface media source to be created in a distinct media server process space. Once the surface texture client and surface media source are created, these components connect together and to appropriate drivers and/or other components to establish a pipeline.

Media encoder filter 420 may include a pipeline interactor 442 that interacts with an established pipeline via a surface object. The pipeline interactor 442 may perform a cross process call to the media server process to request that the surface media source create the surface object. The created surface object may correspond to the previously discussed surface object that is included in a native window associated with the surface texture client. Pipeline interactor 442 can then request and send image data (e.g., frames) using the surface object.

Figure 5:
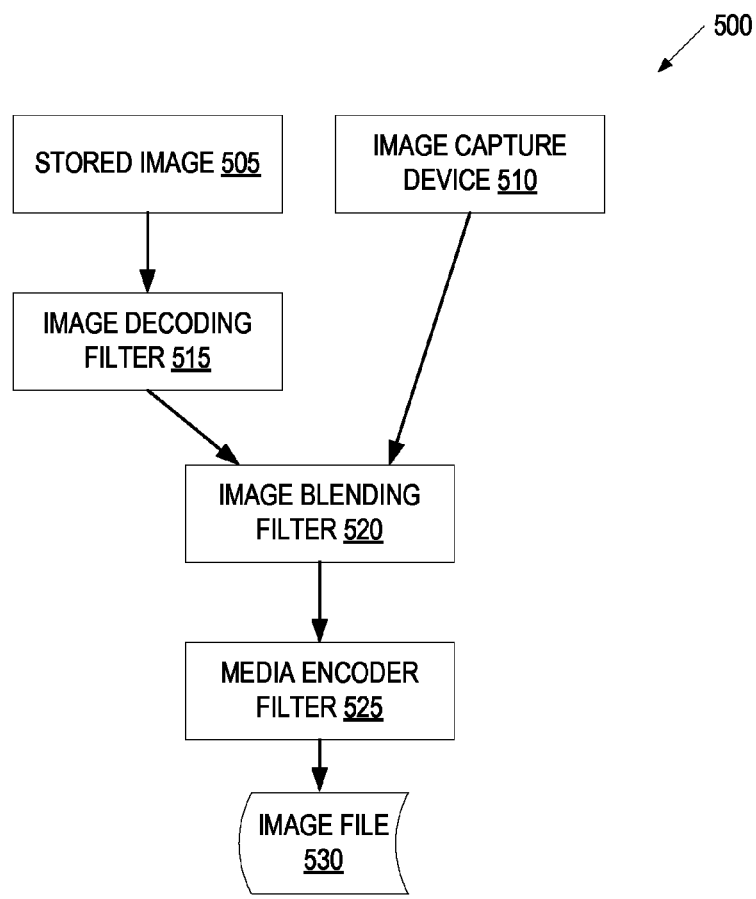
FIG. 5 illustrates a filter graph, in accordance with one embodiment of the present invention.

FIG. 5 illustrates one example of a filter graph 500 for blending image data, in accordance with one embodiment of the present invention. The filter graph 500 has a stored image source node 505 and an image capture device source node 510. The stored image source node 505 provides inputs an image file into an image decoding filter 515. The image decoding filter 515 causes a hardware image decoder to decode the stored image into a format that can be processed by a GPU. An image blending filter 520 receives image data from the image capture device source node 510 and the image decoding filter 515. The image blending filter 520 then combines at least portions of the two images. For example, image output by image decoding filter 515 may be a background image, and the image output by the image capture device may be a digital photo of a person. The image blending filter may analyze the image from the image capture device to determine foreground and background components, and may then replace the background components with image data received from the image decoding filter 515.

Media encoder filter 525 receives as an input a blended image output by the image blending filter 520, and generates an output of an encoded media file (e.g., an MPEG-4 file). Media encoder filter 525 may correspond to media encoder filter 420 of FIG. 4.

Figure 6:
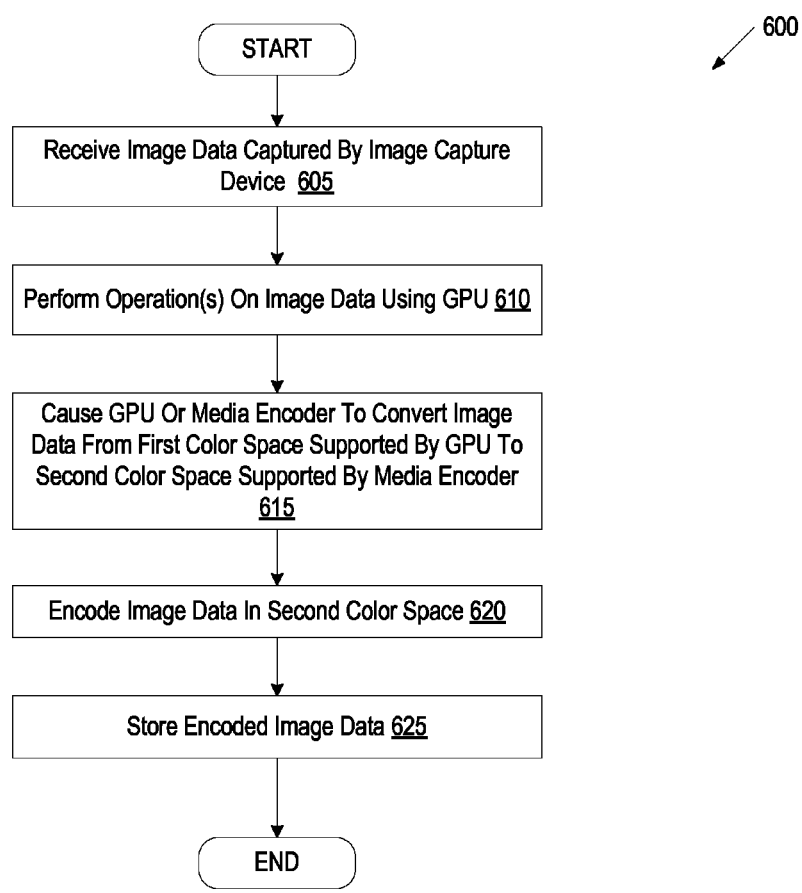
FIG. 6 is a flow diagram illustrating one embodiment for a method of capturing, processing and encoding image data.

FIG. 6 is a flow diagram illustrating one embodiment for a method 600 of capturing, processing and encoding image data. Method 600 may be performed by processing logic that may comprise hardware (circuitry, dedicated logic, etc.), software (such as is run on a general purpose computer system or a dedicated machine), or a combination of both. In one embodiment, the method 600 is performed by a mobile computing device incorporating the image processing pipeline architecture of FIG. 1. For example, method 600 may be performed by a mobile computing device having an image capture device, a GPU and a media encoder. The mobile computing device may include a mobile filter framework, which may have loaded a media encoder filter to establish at least a portion of an image processing pipeline.

At block 605 of method 600, processing logic receives image data that has been captured by an image capture device (e.g., a camera). The image capture device may write the image data to an image buffer, and then release the image buffer to processing logic. Processing logic may provide the image data to a GPU (e.g., by assigning the image buffer to a graphics driver for the GPU).

At block 610, the processing logic directs the GPU to perform one or more operations on the received image data. Some example operations include performing object detection and/or image recognition, blending the image data with other image data, applying effects to the image data, and so forth.

Once the GPU has processed the image data, processing logic provides the image data to a media encoder (e.g., by assigning the image buffer to the media encoder). The media encoder may operate using a different color space than the GPU. Accordingly, at block 615, processing logic directs the GPU or the media encoder to convert the image data from a first color space supported by the GPU into a second color space supported by the media encoder. Processing logic may determine which of the GPU and the media encoder is to perform the color space conversion. This determination may be performed based on comparing total and/or available resources of the GPU and the media encoder. For example, if it is determined that the GPU has more available resources than the media encoder, then processing logic may direct the GPU to perform the color space conversion.

At block 620, processing logic directs the media encoder to encode the image data. Since the image data has been converted into the color space used by the media encoder, the media encoder can encode the image data using its natively supported color space. At block 625, processing logic stores the encoded image data to a data store. The data store may be incorporated into the mobile device, or may be remote storage (e.g., a network storage device or cloud storage) to which the mobile device is wirelessly connected.

Notably, the image capture device, GPU and media encoder discussed with reference to method 600 may be set up in a pipeline. Accordingly, as soon as the image capture device sends a first frame of image data to the GPU, the image capture device may begin capturing a second frame. The GPU can then operate on the first frame while the image capture device captures the second frame. The GPU can send the first frame to the media encoder once it has completed processing the first frame, and may then receive the second frame from the image capture device. The media encoder may encode the first frame while the GPU processes the second frame and the image capture device captures a third frame. Thus, each of the image capture device, GPU and media encoder may operate in parallel for maximum efficiency.

Figure 7:
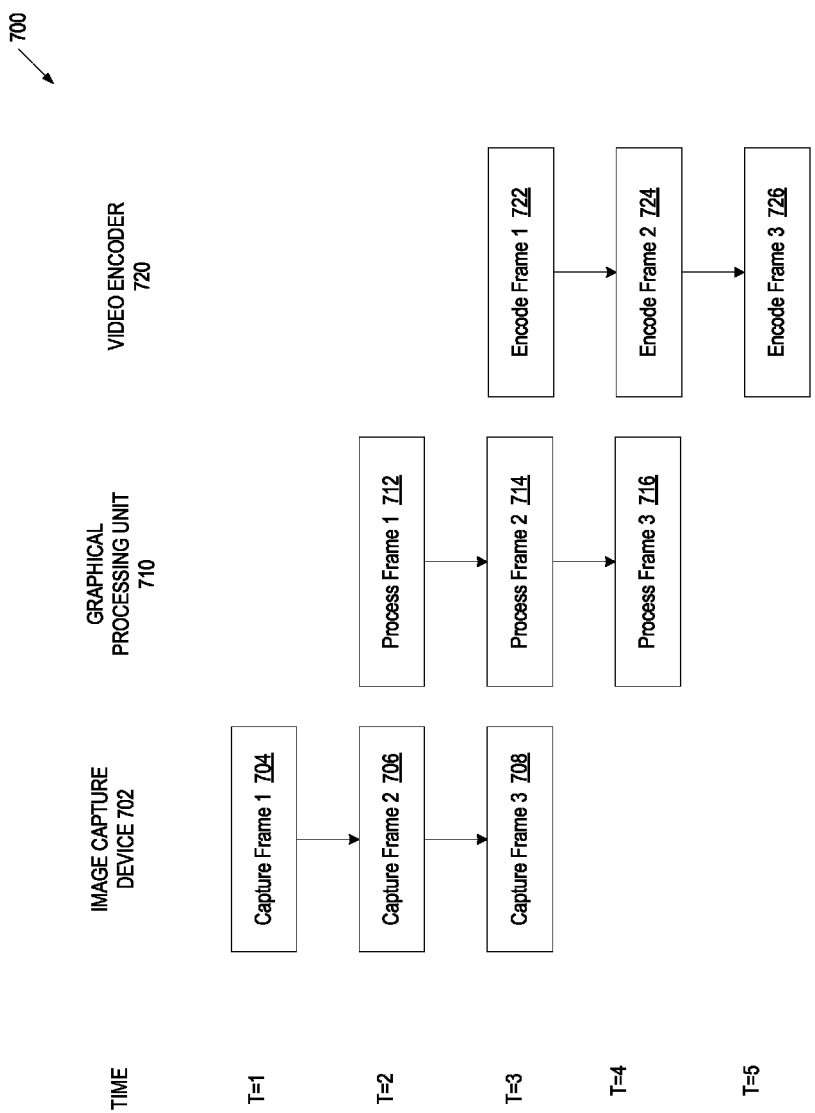
FIG. 7 illustrates a processing sequence for an image processing pipeline, in accordance with one embodiment of the present invention.

FIG. 7 illustrates a processing sequence for an image processing pipeline, in accordance with one embodiment of the present invention. At a time t=1, an image capture device 702 captures a frame 1 (block 704). At a time t=2, the image capture device captures frame 2 (block 706) and the GPU 710 processes frame 1 (block 712). At a time t=3, the image capture device captures frame 3 (block 708), the GPU processes frame 2 (block 714) and a video encoder 720 encodes frame 1 (block 722). At a time t=4, the GPU processes frame 3 (block 716) and the video encoder encodes frame 2 (block 724). At a time t=5, the video encoder encodes frame 3 (block 726). If additional frames were captured, this sequence could continue indefinitely. Note that time may represent an actual temporal time or a logically sequential time (which may or may not correspond to an actual temporal sequence).

Figure 8:
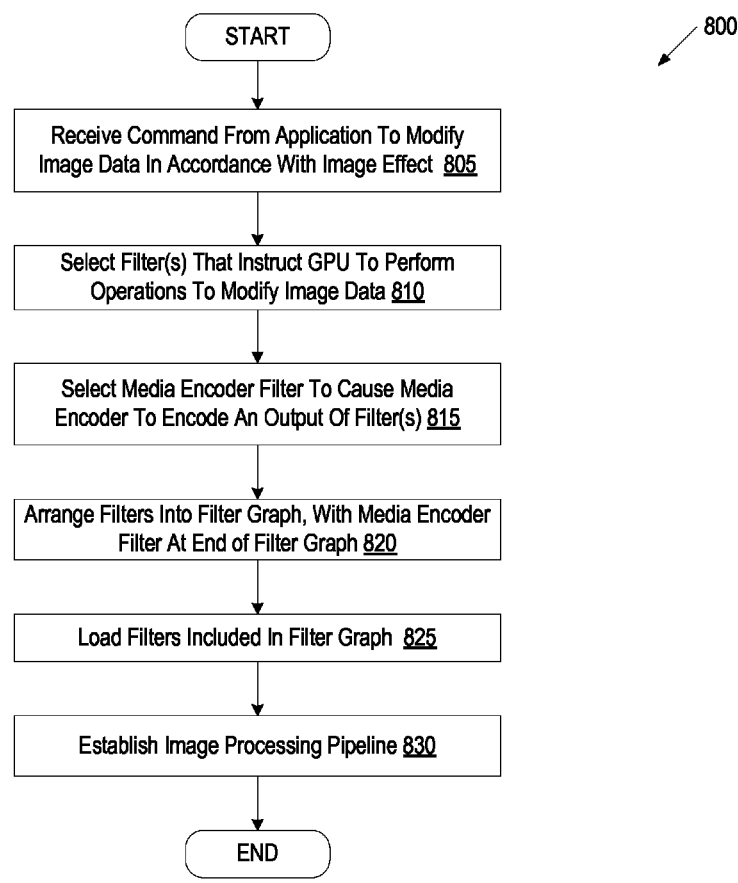
FIG. 8 is a flow diagram illustrating one embodiment for a method of setting up a filter graph for a mobile filter framework.

FIG. 8 is a flow diagram illustrating one embodiment for a method of setting up a filter graph for a mobile filter framework. Method 800 may be performed by processing logic that may comprise hardware (circuitry, dedicated logic, etc.), software (such as is run on a general purpose computer system or a dedicated machine), or a combination of both. In one embodiment, the method 800 is performed by a mobile computing device incorporating the mobile filter framework 400 of FIG. 4.

At block 805 of method 800, processing logic receives a command from an application to modify media data in accordance with an image effect. The image effect may be selected by a user, or may be auto-selected by processing logic. At block 810, processing logic identifies a single filter or a collection of filters that together can accomplish the selected image effect. These filters may be specified in a filter graph provided by the application, or may automatically be determined based on a request received from the application. Each filter may be associated with metadata that identifies the capabilities of the filter, as well as input data types and/or output data types usable by that filter.

At block 815, processing logic selects a media encoder filter that, once loaded, will cause a media encoder to encode an output of the one or more other filters that were selected. At block 820, processing logic arranges the filters into a filter graph, with the media encoder filter arranged at an end of the filter graph. Filters may be arranged by attaching outputs of filters to inputs of subsequent filters in the filter graph.

At block 825, processing logic loads the filters in the filter graph. At block 830, upon being loaded, the filters in the filter graph set up an image processing pipeline. The one or more filters that instruct the GPU to perform operations to modify the image data may set up a first leg of the pipeline that connects an image capture device to a GPU (referred to with reference to FIG. 2 as a producer pipeline). The media encoder filter may establish a second leg of the pipeline that connects the GPU to a media encoder (referred to with reference to FIG. 3 as a consumer pipeline). Setting up the consumer pipeline may include loading a first module in a process space shared with the application and loading a second module in a remote process space that controls the media encoder. These modules may then connect together, and may connect to a graphics driver that controls the GPU and to a media encoder driver that controls the media encoder. Once the image processing pipeline is established, captured image data may be processed and then encoded and stored with minimal to no copying of data.

Figure 9:
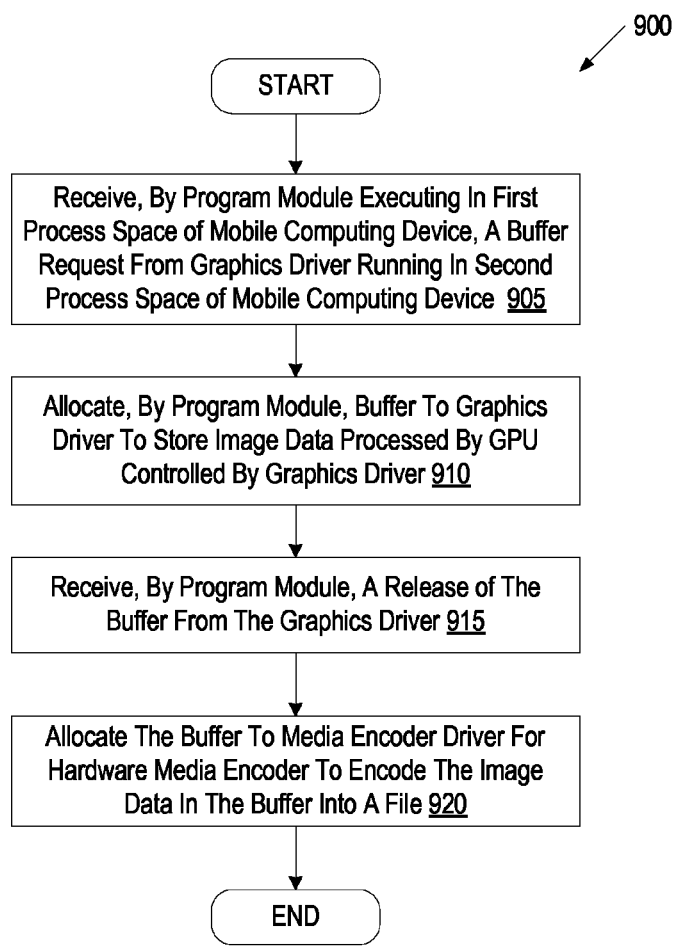
FIG. 9 is a flow diagram illustrating one embodiment for a method of sharing buffers between a graphics processing unit and a hardware media encoder.

FIG. 9 is a flow diagram illustrating one embodiment for a method 900 of sharing buffers between a graphics processing unit (GPU) and a hardware media encoder. Method 900 may be performed by processing logic that may comprise hardware (circuitry, dedicated logic, etc.), software (such as is run on a general purpose computer system or a dedicated machine), or a combination of both. In one embodiment, the method 900 is performed by a mobile computing device incorporating the image processing pipeline architecture of FIG. 1.

At block 905 of method 900, a program module executing in a first process space of a mobile computing device receives a buffer request. The buffer request may be received from a graphics driver running in a second process space of the mobile computing device that is isolated from the first process space. In one embodiment, the buffer request originates from the graphics driver, but is received from an additional program module that runs in the second process space and acts as an intermediary between the graphics driver and the program module. The buffer request may be received in the form of a dequeue buffer call.

At block 910, the program module assigns a buffer to the graphics driver. The graphics driver may then direct the GPU to store image data that the GPU has processed in the buffer. In one embodiment, the buffer is represented by an image buffer handle. The image buffer handle may be assigned to the graphics driver to grant access to modify the buffer. To grant access to the image buffer handle across process space boundaries, the program module may call an operating system kernel to request that the kernel grant the second process space (and thus the graphics driver running in the second process space) access to the image buffer handle.

The GPU will populate the image buffer with processed image data. At block 915, the graphics driver releases the buffer. This may include the graphics driver issuing a queue buffer call for the image buffer to the program module.

At block 920, the program module assigns the buffer to a media encoder driver that may run in the same process space as the program module. The media encoder driver may then direct a hardware media encoder to encode the processed image data stored in the buffer into a file. The method then ends.

Figure 10:
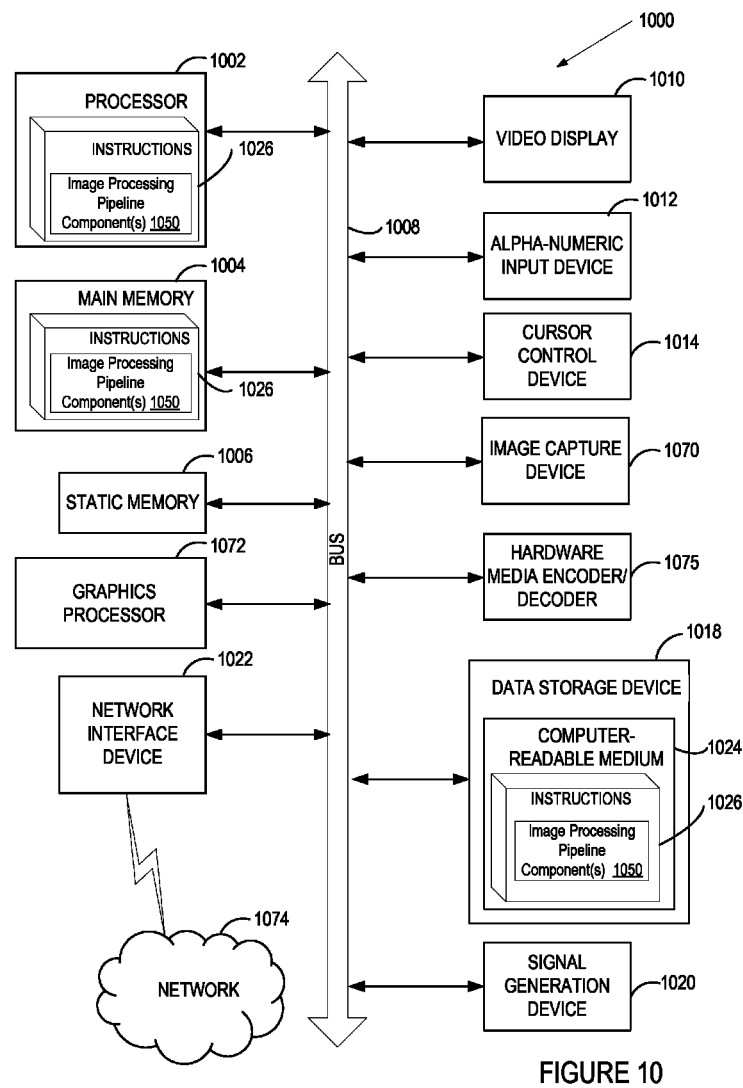
FIG. 10 is a block diagram of an exemplary computer system that may perform one or more of the operations described herein.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may be a mobile computing device, which may operate in the capacity of a server or a client machine in client-server network environment, or as a peer machine in a peer-to-peer (or distributed) network environment. The machine may be a tablet PC, a Personal Digital Assistant (PDA), a cellular telephone, or any portable machine capable of executing a set of instructions (sequential or otherwise) that specify actions to be taken by that machine.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1026 for performing the operations and steps discussed herein.

The data storage device 1018 may include a computer-readable storage medium 1024 on which is stored one or more sets of instructions 1026 (e.g., software) embodying any one or more of the methodologies or functions described herein. The instructions 1026 may also reside, completely or at least partially, within the main memory 1004 and/or within the processor 1002 during execution thereof by the computer system 1000, the main memory 1004 and the processor 1002 also constituting computer-readable storage media. The instructions 1026 may further be transmitted or received over a network 1074 via the network interface device 1022.

In one embodiment, the instructions 1026 include instructions for one or more image processing pipeline components 1050 (e.g., a media encoder filter, a surface texture, a surface texture client, a surface media source, etc.), and/or a software library containing methods that call components of an image processing pipeline. While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker). Additionally, the computer system 1000 may include an image capture device 1070, a hardware media encoder/decoder 1075 and/or a graphics processor (GPU) 1072.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "performing", "causing", "encoding", "storing," "receiving," "allocating," or the like, may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

For simplicity of explanation, the methods have been depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture (e.g., a computer readable storage medium) to facilitate transporting and transferring such methods to computing devices. The term article of manufacture, as used herein, is intended to encompass a computer program accessible from any computer-readable device or storage media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   receiving, by a program module executing in a first process space of a mobile computing device, a buffer request from a graphics driver running in a second process space of the mobile computing device, wherein the second process space is isolated from the first process space;

assigning, by the program module, a buffer to the graphics driver to store image data processed by a graphical processing unit (GPU) controlled by the graphics driver;

receiving, by the program module, a release of the buffer from the graphics driver; and assigning the buffer to a media encoder driver for a hardware media encoder to encode the image data in the buffer into a file.

2. The method of claim 1, wherein the hardware media encoder encodes the processed image data generated by the GPU without any copies of the processed image data having been created.

3. The method of claim 1, wherein assigning the buffer to the graphics driver comprises passing a buffer handle for the buffer to the graphics driver across process space boundaries, and wherein assigning the buffer to the media encoder driver comprises passing the buffer handle to the encoder driver.

4. The method of claim 3, wherein passing the buffer handle to the media encoder driver comprises writing the buffer handle to an additional buffer associated with the media encoder driver.

5. The method of claim 3, wherein passing the buffer handle across the process space boundaries comprises instructing, by the program module, an operating system kernel to grant the graphics driver access to the buffer handle.

6. The method of claim 1, wherein the GPU and the hardware media encoder are pipelined, and wherein the hardware media encoder processes a frame while the GPU processes a next frame.

7. The method of claim 1, wherein the image data does not specify a color space, and wherein the GPU or the hardware media encoder converts the color space from a first color space supported by the GPU to a second color space supported by the media encoder.

8. A non-transitory computer readable storage medium having instructions that, when executed by a mobile computing device, cause the mobile computing device to perform a method comprising:

receiving, by a program module executing in a first process space of the mobile computing device, a buffer request from a graphics driver running in a second process space of the mobile computing device, wherein the second process space is isolated from the first process space;

assigning, by the program module, a buffer to the graphics driver to store image data processed by a graphical processing unit (GPU) controlled by the graphics driver;

receiving, by the program module, a release of the buffer from the graphics driver; and assigning the buffer to a media encoder driver for a hardware media encoder to encode the image data in the buffer into a file.

9. The computer readable storage medium of claim 8, wherein the hardware media encoder encodes the processed image data generated by the GPU without any copies of the processed image data having been created.

10. The computer readable storage medium of claim 8, wherein assigning the buffer to the graphics driver comprises passing a buffer handle for the buffer to the graphics driver across process space boundaries, and wherein assigning the buffer to the media encoder driver comprises passing the buffer handle to the encoder driver.

11. The computer readable storage medium of claim 10, wherein passing the buffer handle to the media encoder driver comprises writing the buffer handle to an additional buffer associated with the media encoder driver.

12. The computer readable storage medium of claim 10, wherein passing the buffer handle across the process space boundaries comprises instructing, by the program module, an operating system kernel to grant the graphics driver access to the buffer handle.

13. The computer readable storage medium of claim 8, wherein the GPU and the hardware media encoder are pipelined, and wherein the hardware media encoder processes a frame while the GPU processes a next frame.

14. The computer readable storage medium of claim 8, wherein the image data does not specify a color space, and wherein the GPU or the hardware media encoder converts the color space from a first color space supported by the GPU to a second color space supported by the media encoder.

15. A mobile computing device comprising:
a graphics processing unit (GPU);
a hardware media encoder; and
a processing device, coupled to the GPU and the hardware media encoder, configured to receive, at a program module executing in a first process space of the mobile computing device, a buffer request from a graphics driver for the GPU running in a second process space of the mobile computing device, wherein the second process space is isolated from the first process space;

assign, from the first process space, a buffer to the graphics driver to store image data processed by the GPU;

receive, at the program module, a release of the buffer from the graphics driver; and assign the buffer to a media encoder driver for the hardware media encoder to encode the image data in the buffer into a file.

16. The mobile computing device of claim 15, wherein the hardware media encoder encodes the processed image data generated by the GPU without any copies of the processed image data having been created.

17. The mobile computing device of claim 15, wherein assigning the buffer to the graphics driver comprises passing a buffer handle for the buffer to the graphics driver across process space boundaries, and wherein assigning the buffer to the media encoder driver comprises passing the buffer handle to the encoder driver.

18. The mobile computing device of claim 17, wherein passing the buffer handle to the media encoder driver comprises writing the buffer handle to an additional buffer associated with the media encoder driver.

19. The mobile computing device of claim 17, wherein passing the buffer handle across the process space boundaries comprises instructing, by the program module, an operating system kernel to grant the graphics driver access to the buffer handle.

20. The mobile computing device of claim 15, wherein the GPU and the hardware media encoder are pipelined, and wherein the hardware media encoder processes a frame while the GPU processes a next frame.

21. The mobile computing device of claim 15, wherein the image data does not specify a color space, and wherein the GPU or the hardware media encoder converts the color space from a first color space supported by the GPU to a second color space supported by the media encoder.

* * * * *